US010576809B2

(12) United States Patent
Lota (10) Patent No.: US 10,576,809 B2
(45) Date of Patent: Mar. 3, 2020

(54) AUTOMATIC WINDOW TINTING SYSTEMS AND METHODS FOR A VEHICLE (71) Applicant: Toyota Motor Engineering & Manufacturing North America, Inc., Erlanger, KY (US)

(72) Inventor: Charan S. Lota, Ann Arbor, MI (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 357 days.

(21) Appl. No.: 15/426,429

(22) Filed: Feb. 7, 2017

(65) Prior Publication Data
US 2018/0141414 A1 May 24, 2018

Related U.S. Application Data (60) Provisional application No. 62/425,232, filed on Nov. 22, 2016.

(51) Int. Cl.
*B60J 3/00* (2006.01)
*B60J 3/04* (2006.01)
(Continued)

(52) U.S. Cl.
CPC ............... *B60J 3/04* (2013.01); *B60N 2/002* (2013.01); *B60Q 1/503* (2013.01)

(58) Field of Classification Search
None
See application file for complete search history.

(56) References Cited

U.S. PATENT DOCUMENTS 8,044,784 B2 10/2011 Ghannam et al.
8,102,586 B2 1/2012 Albahri
(Continued)

FOREIGN PATENT DOCUMENTS

WO WO2016115164 7/2016

OTHER PUBLICATIONS

"Wi-Fi-controlled smart windows auto-tint", https://www.technologyreview.com/s/507351/wi-fi-controlled-smart-windows-auto-tint/ Published/Accessed: Nov. 12, 2012.
(Continued)

*Primary Examiner* — John Olszewski
*Assistant Examiner* — Gerrad A Foster
(74) *Attorney, Agent, or Firm* — Dinsmore & Shohl LLP (57) ABSTRACT An automatic window tinting system for a vehicle includes a selectively transparent window, a controller including a processing unit and a non-transitory computer readable memory, a temperature sensor, an occupant sensor, a proximity sensor, and a computer readable and executable instruction set. The computer readable and executable instruction set causes the processing unit to receive an occupant sensor signal, a temperature signal and a proximity sensor signal, maintain the selectively transparent window in a first light transmissivity state when the occupant sensor signal is indicative of a presence of an unattended occupant, transition the selectively transparent window to a second light transmissivity state when the temperature signal is indicative of a temperature inside the vehicle that is greater than a threshold value, and transition the selectively transparent window to a third light transmissivity state when the proximity sensor signal is indicative of the presence of a passerby.

20 Claims, 5 Drawing Sheets (51) Int. Cl.
    *B60Q 1/50*     (2006.01)
    *B60N 2/00*     (2006.01)

(56) References Cited

U.S. PATENT DOCUMENTS

| | | |
|---|---|---|
| 8,781,676 B2 | 7/2014 | McIntyre, Jr. et al. |
| 2003/0210355 A1 | 11/2003 | Dao |
| 2009/0116098 A1 | 5/2009 | Chang |
| 2011/0163866 A1* | 7/2011 | Ghannam .................. B60J 3/04 |
| | | 340/449 |
| 2015/0261219 A1 | 9/2015 | Cuddihy et al. |
| 2016/0077400 A1 | 3/2016 | Lam et al. |
| 2016/0116819 A1 | 4/2016 | Moskowitz |
| 2016/0200168 A1* | 7/2016 | Boyer .................... H04R 19/04 |
| | | 701/45 |
| 2018/0079284 A1* | 3/2018 | Choi ....................... E05F 15/75 |

OTHER PUBLICATIONS

"Dynamic window controls for automotive, aerospace, marine and architectural application", http://www.spdcontrolsystems.com/; Published/Accessed: Aug. 20, 2016.

"Here's how smart glass makes better buildings", http://viewglass.com/smart-glass/Published/Accessed: Aug. 23, 2016.

* cited by examiner

AUTOMATIC WINDOW TINTING SYSTEMS AND METHODS FOR A VEHICLE

CROSS-REFERENCE TO RELATED APPLICATIONS

This application claims the benefit of U.S. Provisional Application No. 62/425,232, entitled "AUTOMATIC WINDOW TINTING SYSTEMS AND METHODS FOR A VEHICLE," filed Nov. 22, 2016, the entirety of which is hereby incorporated by reference.

TECHNICAL FIELD

The present specification generally relates to systems and methods for automatically tinting glass and, more specifically, to automatically tinting vehicle windows when a vehicle is not in operation.

BACKGROUND

Vehicles are fitted with tinted glass for use as windows or rear shields to reduce the amount of light in the passenger cabin. Large amounts of light incident within a passenger cabin can make it difficult for a driver to view the instrument panel or see out of the vehicle in the direction of the light source. Additionally, heating of the passenger cabin can result from prolonged exposure to direct sunlight. During operation of a vehicle, the air condition system may address the heating of the passenger cabin. However, when a vehicle is not in operation the only defense to reducing heat in the passenger cabin is the tinted glass. Due to various state regulations, tinted glass sufficient to reduce the rate of heating in the passenger cabin is prohibited during operation of a vehicle and therefore lacking when a vehicle is not in operation.

Accordingly, a need exists for alternative means for tinting vehicle windows having the ability to automatically change tint levels.

SUMMARY

In one embodiment, an automatic window tinting system for a vehicle may include a selectively transparent window, a controller including a processing unit and a non-transitory computer readable memory, a temperature sensor, an occupant sensor, a proximity sensor, and a computer readable and executable instruction set. The selectively transparent window may couple to one or more vehicle windows. The controller may electrically couple to the selectively transparent window. The temperature sensor may communicatively couple to the controller where the temperature sensor provides a temperature signal indicative of a temperature inside the vehicle. The occupant sensor may communicatively couple to the controller where the occupant sensor provides an occupant sensor signal indicative of a presence or an absence of an unattended occupant. The proximity sensor may communicatively couple to the controller where the proximity sensor provides a proximity sensor signal indicative of a presence or an absence of a passerby. The computer readable and executable instruction set stored in the non-transitory computer readable memory may cause the processing unit to receive the occupant sensor signal, the temperature signal and the proximity sensor signal, maintain the selectively transparent window in a first light transmissivity state when the occupant sensor signal is indicative of the presence of the unattended occupant, transition the selectively transparent window to a second light transmissivity state when the temperature signal is indicative of the temperature inside the vehicle that is greater than a threshold value, and transition the selectively transparent window to a third light transmissivity state when the proximity sensor signal is indicative of the presence of the passerby.

In another embodiment, a method of automatically tinting a vehicle window may include determining a presence of an unattended occupant in a vehicle with an occupant sensor, where the occupant sensor generates an occupant sensor signal indicative of the presence or an absence of the unattended occupant, providing a first control signal to a selectively transparent window to change the selectively transparent window to a first light transmissivity state when the occupant sensor signal is indicative of the presence of the unattended occupant, monitoring a temperature inside the vehicle with a temperature sensor where the temperature sensor generates a temperature signal indicative of the temperature inside the vehicle, monitoring an area around the vehicle for a presence of a passerby with a proximity sensor where the proximity sensor generates a proximity sensor signal indicative of the presence or an absence of the passerby, providing a second control signal to the selectively transparent window to change the selectively transparent window to a second light transmissivity state when the temperature signal is indicative of the temperature inside the vehicle that is greater than a threshold value, and providing a third control signal to the selectively transparent window to change the selectively transparent window to a third light transmissivity state when the proximity sensor signal is indicative of the presence of the passerby.

In yet another embodiment, an automatic window tinting system a vehicle may include a selectively transparent window, a controller including a processing unit and a non-transitory computer readable memory, a temperature sensor, an occupant sensor, a proximity sensor, and a computer readable and executable instruction set. The selectively transparent window may couple to one or more vehicle windows. The controller may electrically couple to the selectively transparent window. The temperature sensor may communicatively couple to the controller where the temperature sensor provides a temperature signal indicative of a temperature inside a vehicle. The occupant sensor may communicatively couple to the controller where the occupant sensor provides an occupant sensor signal indicative of a presence or an absence of an unattended occupant. The proximity sensor may communicatively couple to the controller where the proximity sensor provides a proximity sensor signal indicative of a presence or an absence of a passerby. The computer readable and executable instruction set stored in the non-transitory computer readable memory may cause the processing unit to receive the occupant sensor signal, the temperature signal and the proximity sensor signal, initially maintain the selectively transparent window in a first light transmissivity state when the occupant sensor signal is indicative of the presence of the unattended occupant, transition the selectively transparent window to a second light transmissivity state when the temperature signal is indicative of the temperature inside the vehicle that is greater than a threshold value, transition the selectively transparent window to a third light transmissivity state when the proximity sensor signal is indicative of the presence of the passerby, and maintain the selectively transparent window in a fourth light transmissivity state when the occupant sensor signal is indicative of the absence of the unattended occupant.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
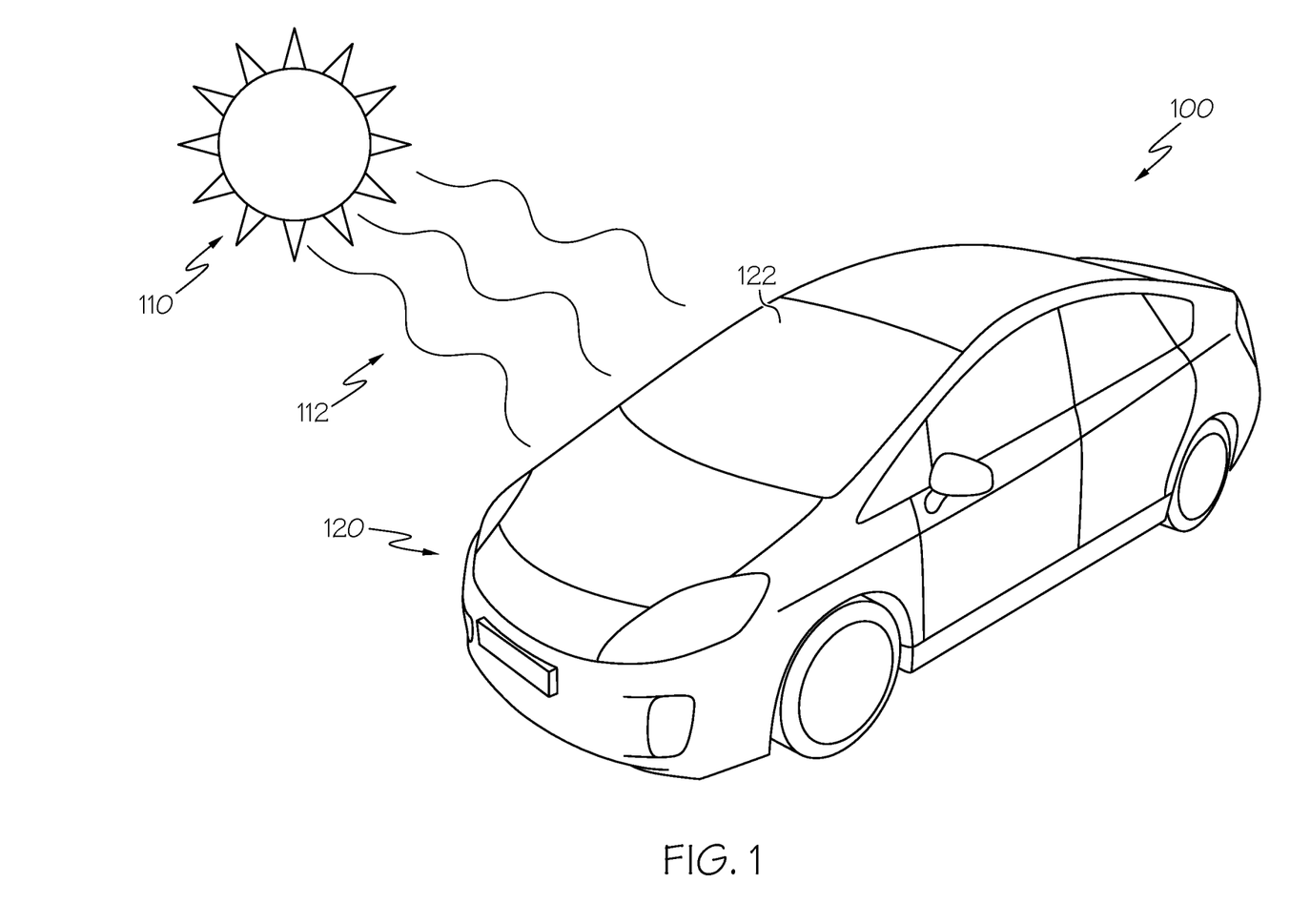
FIG. 1 schematically depicts the sun projecting solar energy onto a vehicle according to one or more embodiments shown and described herein.
Figure 2:
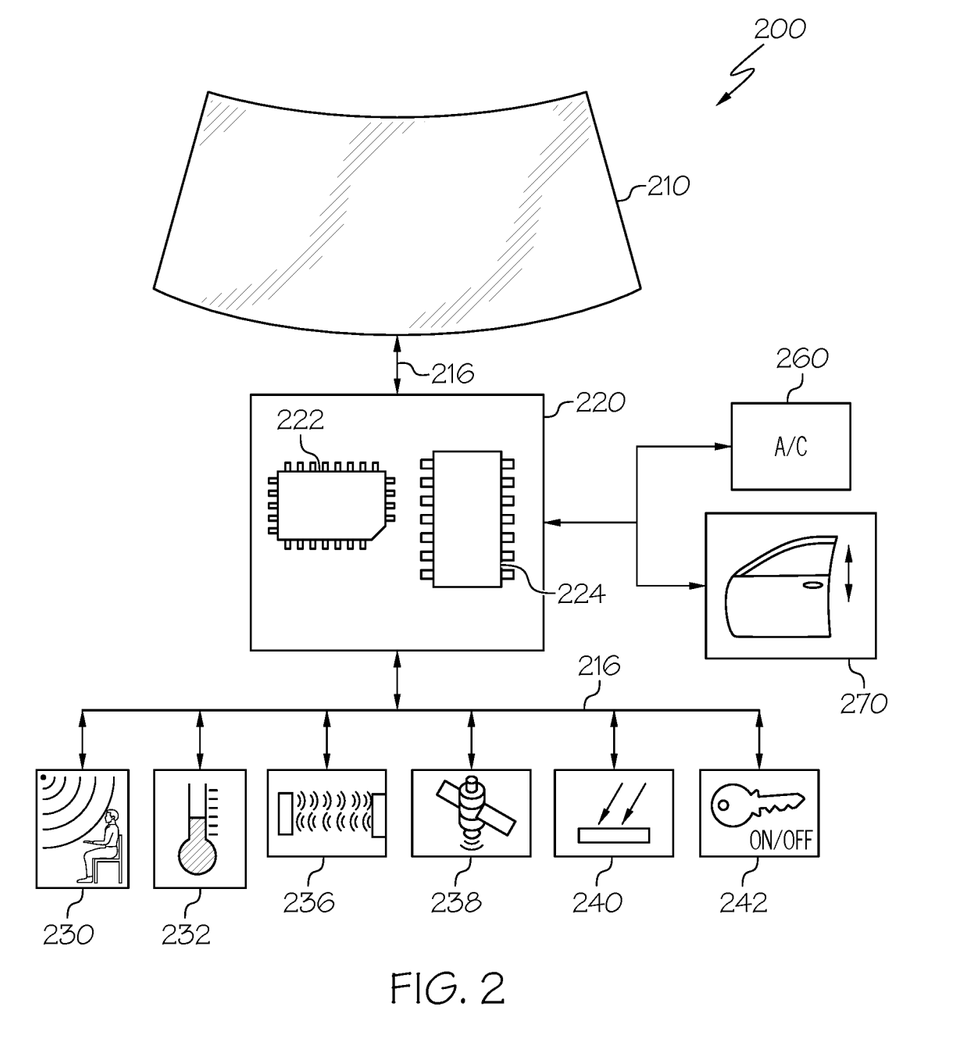
FIG. 2 schematically depicts components of an example automatic window tinting system according to one or more embodiments shown and described herein.

FIGS. 1 and 2 generally depict one embodiment of an automatic window tinting system having a vehicle fitted with selectively transparent windows. The selectively transparent windows are electrically coupled to a controller. The controller adjusts the light transmissivity of the selectively transparent windows through electrical control signals in response to sensors providing sensor signals. The sensors and sensor signals may include a temperature sensor providing a temperature signal, an occupant sensor providing an occupant sensor signal indicative of the presence or the absence of an unattended occupant in a vehicle, and a proximity sensor providing a proximity sensor signal indicative of the presence or the absence of a passerby. The sensors are communicatively coupled to the controller. The controller processes the sensor signals using a processing unit that executes a computer readable and executable instruction set stored in a non-transitory computer readable memory and outputs an electrical control signal to control the selectively transparent windows based on the received sensor signals. Various embodiments of the automatic window tinting system and methods for operating the automatic window tinting system will be described in more detail herein.

Referring now to FIG. 1, a diagram of an environment 100 showing the sun 110 projecting solar energy 112 onto a vehicle 120 is depicted. Solar energy 112 incident on the vehicle 120 may be reflected or absorbed by the vehicle 120. Solar energy 112 incident on a vehicle window 122 of a vehicle 120 radiates through the window and is absorbed by the inside of the vehicle 120 causing the vehicle cabin to rise in temperature. Generally, air is trapped inside the vehicle 120 when the vehicle 120 is not in operation or the vehicle windows 122 are not open. Therefore, the solar energy 112 absorbed by the interior of the vehicle 120 increases the temperature of the vehicle cabin. A vehicle window 122 with a tint applied reduces the amount of solar energy 112 that radiates through the vehicle window 122 and is absorbed by the interior. Accordingly, the amount of window tint decreases the rate at which the temperature inside the vehicle 120 increases because less solar energy 112 radiates through a vehicle window 122.

Referring now to FIG. 2, an example of an automatic window tinting system 200 is schematically depicted. The automatic window tinting system 200 includes a selectively transparent window 210, a communication path 216, a controller 220, a processing unit 222, a non-transitory computer readable memory 224 storing a computer readable and executable instruction set, an occupant sensor 230, a temperature sensor 232, and a proximity sensor 236. The automatic window tinting system 200 may also include a GPS unit 238, a light sensor 240 and an ignition sensor 242. In embodiments, the components of the automatic window tinting system 200 may be contained within or mounted to a vehicle 120 (depicted in FIG. 1). The various components of the automatic window tinting system 200, and the interaction thereof, will be described in further detail below.

Still referring to FIG. 2, the selectively transparent window 210 may be formed from any medium capable of transitioning between various states of light transmissivity in response to a control signal. For example, one light transmissivity state may be a transparent state. Further, a second light transmissivity state may be an opaque state where light incident on the selectively transparent window 210 in the opaque state is greater than the light that is transmitted through selectively transparent window 210 in the opaque state. As an alternative, the second light transmissivity state may be a reflective state wherein, similar to an opaque state, light radiating through the selectively transparent window 210 is less than the light incident on the selectively transparent window 210 but rather than scattering light, the selectively transparent window 210 reflects at least a portion of the light. Additionally or alternatively, the transmissivity of the selectively transparent window 210 may be variable. For example, the light transmissivity of the selectively transparent window 210 may be varied from 0% (i.e., completely opaque) to 100% (i.e., completely transparent) or any percentage there between. For reference, light transmissivity, light transmissivity state, tint and tint level may be used synonymously herein. The term tint or tint level does not suggest or limit the term light transmissivity state as defined herein.

As non-limiting examples, the selectively transparent window 210 may comprise, without limitation, a liquid crystal display, a polymer-dispersed liquid crystal film, an electrochromic material, or the like. Commercially available non-limiting examples of a selectively transparent window 210 include, without limitation, transparent glass or polymer substrate to which Smart Tint® film from Smart Tint, Inc., Smart Film from Rayno Window Film and Glass Apps' SuperClear switchable privacy window film are applied. As a non-limiting example, the selectively transparent window 210 may be a film applied to a surface of a vehicle window 122. As a non-limiting example, the selectively transparent window 210 may be a layer interleaved in a vehicle window 122. Further, as a non-limiting example, the selectively transparent window 210 may operate as the vehicle window 122 standing alone. For example, the vehicle window 122 may be a liquid crystal display where the liquid crystal display is a selectively transparent window 210 capable of transitioning between various light transmissivity states in response to a control signal. Additionally, the selectively transparent window 210 may be a display capable of providing text, messages and/or images. For example, the selectively transparent window 210 may be a liquid crystal display communicatively coupled to a processing unit 222 and non-transitory computer readable memory 224 capable of functioning as a display driver. The processing unit 222 may generate signals for activating elements of the display in a temporal sequence to create the desired text or images. In such embodiments, a displayed text may include a message comprising, without limitation, "Help", "Hello" or "Stay Away."

The communication path 216 may be formed from any medium that is capable of transmitting a signal such as, for example, conductive wires, conductive traces, optical waveguides, or the like. Moreover, the communication path 216 may be formed from a combination of mediums capable of transmitting signals. In one embodiment, the communication path 216 comprises a combination of conductive traces, conductive wires, connectors, and buses that cooperate to permit the transmission of electrical data signals to components such as processing units, memories, sensors, input devices, output devices, and communication devices. Accordingly, the communication path 216 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 216 communicatively couples the various components of the automatic window tinting system 200. As used herein, the term "communicatively coupled" means that coupled components are capable of exchanging data signals with one another such as, for example, electrical signals via conductive medium, electromagnetic signals via air, optical signals via optical waveguides, and the like.

Still referring to FIG. 2, the controller 220 may be any device or combination of components comprising a processing unit 222 and non-transitory computer readable memory 224. The processing unit 222 of the automatic window tinting system 200 may be any device capable of executing the computer readable and executable instruction set. Accordingly, the processing unit 222 may be a controller 220, an integrated circuit, a microchip, a computer, or any other computing device. The processing unit 222 is communicatively coupled to the other components of the automatic window tinting system 200 by the communication path 216. Accordingly, the communication path 216 may communicatively couple any number of processing units 222 with one another, and allow the components coupled to the communication path 216 to operate in a distributed computing environment. Specifically, each of the components may operate as a node that may send and/or receive data. While the embodiment depicted in FIG. 2 includes a single processing unit 222, other embodiments may include more than one processing unit 222.

The non-transitory computer readable memory 224 of the automatic window tinting system 200 is coupled to the communication path 216 and communicatively coupled to the processing unit 222. The non-transitory computer readable memory 224 may comprise RAM, ROM, flash memories, hard drives, or any non-transitory memory device capable of storing machine-readable instructions such that the machine-readable instructions can be accessed and executed by the processing unit 222. The computer readable and executable instruction set may comprise logic or algorithm(s) written in any programming language of any generation (e.g., 1GL, 2GL, 3GL, 4GL, or 5GL) such as, for example, machine language that may be directly executed by the processing unit 222, or assembly language, object-oriented programming (OOP), scripting languages, microcode, etc., that may be compiled or assembled into machine readable instructions and stored in the non-transitory computer readable memory 224. Alternatively, the computer readable and executable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 2 includes a single non-transitory computer readable memory 224, other embodiments may include more than one memory module.

Still referring to FIG. 2, an occupant sensor 230 may be any device or combination of components capable of outputting an occupant sensor signal indicative of the presence or absence of an unattended occupant in a vehicle 120. The occupant sensor 230 determines if an occupant remains in the passenger compartment of the vehicle 120 after the driver has exited the vehicle 120 and the drive system has been shut off. In embodiments, the occupant sensor 230 may comprise a pressure sensor associated with each vehicle seat. Alternatively, the occupant sensor 230 may comprise one or more of a camera, a motion sensor, a strain gauge, a pressure sensor, a microphone, a heat sensor, a contact sensor and seat belt restraint sensor to determine the presence or absence of an unattended occupant. The occupant sensor 230 may output one or more sensor signals to the controller 220 to determine the presence or absence of an unattended occupant. The occupant sensor 230 is communicatively coupled to the controller 220 providing at least one occupant sensor signal for determining the presence or absence of an unattended occupant in the vehicle 120.

The temperature sensor 232 is coupled to the communication path 216 and communicatively coupled to the controller 220. The temperature sensor 232 may be any device capable of outputting a temperature signal indicative of a temperature sensed by the temperature sensor 232. As non-limiting examples, the temperature sensor 232 may comprise a thermocouple, a resistive temperature device, an infrared sensor, a bimetallic device, a change of state sensor, a thermometer, a silicon diode sensor, or the like. In some embodiments, one or more temperature sensors 232 may be implemented to determine the temperature in a variety of locations, for example, inside the passenger cabin and outside the vehicle 120. In yet further embodiments, one or more temperature sensors 232 may be implemented to determine the temperature over an expanse of the vehicle cabin or exterior of a vehicle 120.

The proximity sensor 236 is coupled to the communication path 216 and communicatively coupled to the controller 220. The proximity sensor 236 may be any device capable of outputting a proximity sensor signal indicative of a presence or an absence of a passerby. A passerby may be a person or an object under the control of a person within a predefined area around the exterior of the vehicle 120. As a non-limiting example, a passerby may be a person walking near the vehicle 120. As another non-limiting example, a passerby may be a person riding a bicycle near the vehicle 120. In embodiments, the proximity sensor 236 may be tuned to output a proximity sensor signal when a passerby is detected within the predefined area. In embodiments, the predefined area may be defined as the distance from the exterior of the vehicle 120 outward to about 2 feet from the exterior of the vehicle 120. Optionally, the distance may be, as non-limiting examples, about 3 feet, about 6 feet, about 12 feet or about 15 feet from the exterior of the vehicle 120. In some embodiments, the proximity sensor 236 may include a laser scanner, a capacitive displacement sensor, a Doppler Effect sensor, an eddy-current sensor, an ultrasonic sensor, a magnetic sensor, an optical sensor, a radar sensor, a sonar sensor, or the like. Some embodiments may include a combination of several proximity sensors 236 providing a plurality of proximity sensor signals to the controller 220 for determining the presence or absence of a passerby. In some embodiments, the proximity sensor 236 may be one or more sensors associated with the collision detection system of the vehicle 120.

Still referring to FIG. 2, in further embodiments, a global positioning system, (GPS) 238, is coupled to the communication path 216 and communicatively coupled to the controller 220. The GPS unit 238 is capable of generating an output indicative of a location. The output being a GPS signal communicated to the controller 220 via the communication path 216. However, the GPS unit 238 may be interchangeable with any other system capable of generating an output indicative of a location. For example, a local positioning system that provides a location based on cellular signals and broadcast towers or a wireless signal detection device capable of triangulating a location by way of wireless signals received from one or more wireless signal antennas.

In some embodiments, a light sensor 240 is coupled to the communication path 216 and communicatively coupled to the controller 220. The light sensor 240 is any sensor capable of generating a light sensor signal indicative of the presence of light. In some embodiments, the light sensor 240 is a device that measures light intensity such as, for example, an optical detector, a light dependent resistor, a photodiode, a phototube and the like. In some embodiments, a light sensor 240 may be positioned on the dash of a vehicle 120. Optionally, a light sensor 240 may also be positioned on the rear deck of a vehicle 120, integrated with the selectively transparent window 210, or within a rear-view mirror coupled to the windshield. In some embodiments, one or more light sensors 240 may be implemented and positioned in a vehicle 120 to detect light incident on the vehicle 120.

The automatic window tinting system 200 may further include an ignition sensor 242 that is coupled to the communication path 216 and communicatively coupled to the controller 220. The ignition sensor 242 determines whether the drive system has been put in a shut off or deactivated state. The ignition sensor 242 could be any sensor suitable for determining engine ON/OFF, such as, without limitation, an oil pressure sensor, a fuel pressure sensor, a crankshaft position sensor, a camshaft position sensor, a spark plug operation sensor, a battery voltage sensor, or the like.

Still referring to FIG. 2, the controller 220 may be electrically coupled to the air conditioning system 260 and the window motors 270 of the vehicle 120 to facilitate operation of each system in response to the computer readable and executable instruction set executed by the processing unit 222. The window motors 270 of the vehicle 120 are adapted to receive a control signal for opening or closing the one or more windows of the vehicle 120. The air conditioning system 260 is adapted to operate in response to a control signal from the controller 220 even when the drive system is off or deactivated.

In an embodiment of the automatic window tinting system 200, the automatic window tinting system 200 comprises a controller 220 having a processing unit 222 and a non-transitory computer readable memory 224. The controller 220 receives an occupant sensor signal from an occupant sensor 230, a temperature signal from a temperature sensor 232 and a proximity sensor signal from a proximity sensor 236. The occupant sensor 230 is positioned within the vehicle 120 to detect the presence of an unattended occupant. An unattended occupant may be a child, an adult or an animal left behind in a vehicle 120 when the vehicle 120 is parked. The determination of an unattended occupant may include signals from multiple sensors or systems in the vehicle 120. For example, an unattended occupant may be determined by a plurality of occupant sensors 230 where an occupant sensor 230 detecting the presence of a driver indicates the driver is absent and another occupant sensor 230 detecting the presence of a passenger indicates the presence of the passenger. The temperature sensor 232 may be positioned within the vehicle 120 and monitors the temperature within the vehicle cabin. The proximity sensor 236 is positioned to monitor activity within a predefined area around the vehicle 120. When the proximity sensor 236 detects a passerby in the predefined area around the vehicle 120, the proximity sensor 236 generates a proximity sensor signal indicative of the presence of the passerby and the proximity sensor signal is transmitted to the controller 220.

The controller 220 monitors the signals from the communicatively coupled sensors, for example, the temperature signal, the occupant sensor signal and the proximity sensor signal. As the controller 220 receives signals from the communicatively coupled sensors, the processing unit 222 executes the computer readable and executable instruction set and the controller 220 generates control signals for controlling the selectively transparent window 210 in response to the received signals. In some embodiments, the controller 220 outputs a control signal to maintain the light transmissivity state of the selectively transparent window 210. In other embodiments, the controller 220 may output a control signal to transition the light transmissivity state of the selectively transparent window 210. In yet further embodiments, the controller 220 outputs a control signal to activate or deactivate the air conditioning system 260 or open or close one or more of the vehicle windows 122. The controller 220 may be communicatively coupled to any number of vehicle systems and provide the vehicle system with a control signal even when the vehicle drive system is shut off. Other vehicle systems may include without limitation, the lights, the horn, the speakers, the communications system, the door locks, or the like.

Figure 3:
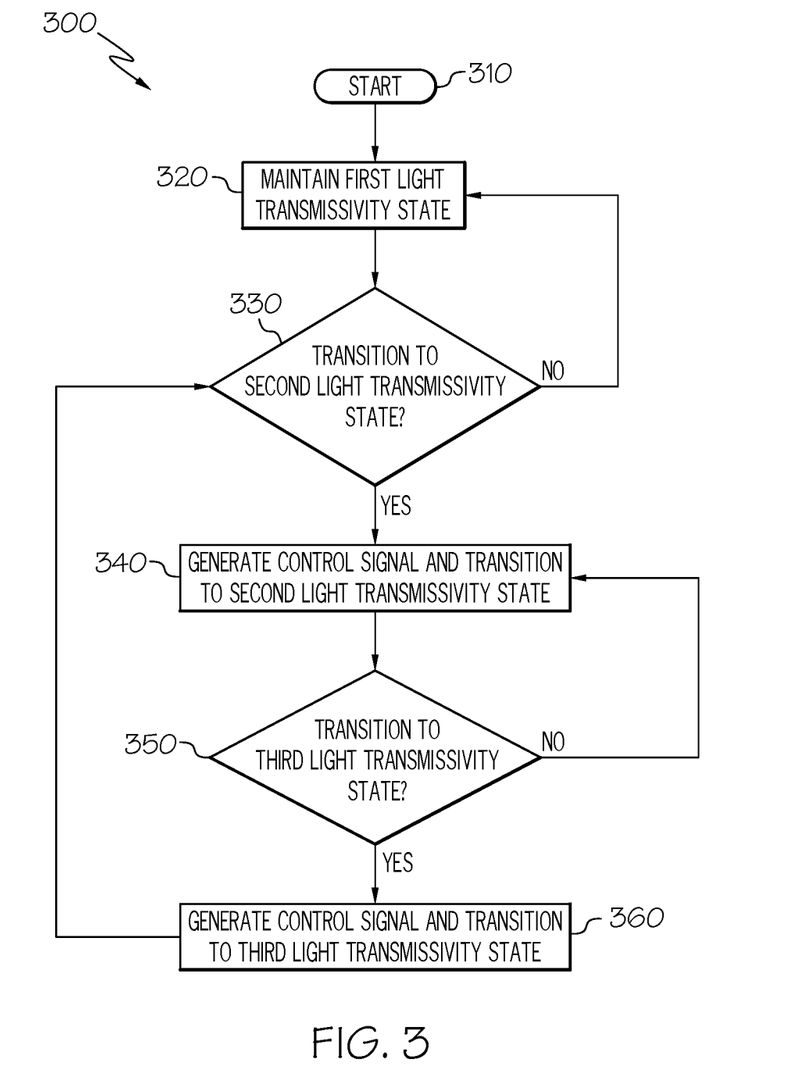
FIG. 3 schematically depicts components of another example of an automatic window tinting system according to one or more embodiments shown and described herein.

The operation of the automatic window tinting system 200 will now be described with further reference to the figures. Referring to FIG. 3, a flowchart of one example embodiment of a method for automatically controlling the tint of a vehicle window 122 is depicted. The flowchart depicted in FIG. 3 is a representation of a computer readable and executable instruction set stored in the non-transitory computer readable memory 224 and executed by the processing unit 222 of the controller 220. The process of the flowchart 300 in FIG. 3 is executed at various times and in response to signals from the sensors communicatively coupled to the controller 220.

In step 310 of FIG. 3, the automatic window tinting system 200 is activated. The automatic window tinting system 200 may be activated in response to a sensor signal indicating the drive system of the vehicle 120 is turned off. This may include an ignition signal from the ignition sensor 242. In some embodiments, the automatic window tinting system 200 is always active regardless of whether the vehicle 120 is on or off, thus may not require a sensor signal to activate the system. In other embodiments, the automatic window tinting system 200 is activated when an occupant sensor 230 detects the presence of an unattended occupant in the vehicle 120.

Once the automatic window tinting system 200 is activated in step 310, the controller 220, in step 320, maintains the selectively transparent windows 210 in a first light transmissivity state. For example, the first light transmissivity state may be transparent or zero-tint. One result of maintaining the selectively transparent window 210 in the first light transmissivity state is to allow a passerby to see the unattended occupant in the vehicle 120 and render assistance if needed.

A first light transmissivity state may be a light transmissivity state in compliance with rules and regulations for the level of tint a vehicle window 122 may have during operation. Similarly, the first light transmissivity state may be a light transmissivity state capable of more than 70% visible light transmission. Specifically, many states have rules and regulations related to the permissible tint level for vehicle windows 122 during operation. For example, a state may require more than 70% visible light transmission for a windshield, but only more than 50% visible light transmission for front side windows. To assure the automatic tinting system remains compliant with state rules and regulations the controller 220 may generate different control signals for each of the selectively transparent windows 210 in order to provide individual windows with a different level of light transmissivity. Additionally, in some embodiments, for example, it may be advantageous for the side windows to transmit less light than the windshield because the amount of incident light on the side windows is greater than on the windshield. Therefore, the controller 220 may generate different control signals for each of the selectively transparent windows 210 in order to provide individual windows with a different level of light transmissivity.

While maintaining the selectively transparent windows 210 in a first light transmissivity state, the controller 220, in step 330, monitors the signals from the communicatively coupled sensors for a condition that triggers a transition in the light transmissivity state of the selectively transparent window 210. For example, in step 330, when the temperature sensor 232 provides a temperature signal indicating the temperature inside the vehicle 120 is greater than a threshold value, the controller 220, in step 340, generates a control signal to transition the selectively transparent windows 210 to a second light transmissivity state. The second light transmissivity state decreases the percentage of visible light transmission through the selectively transparent window 210 as compared to the percentage of visible light transmission of the first light transmissivity state.

Once the automatic window tinting system 200 transitions the selectively transparent window 210 to a second light transmissivity state, for example, in response to a temperature inside the vehicle 120 exceeding a threshold temperature determined in step 330, the system enters step 350. In step 350, the controller 220 monitors the communicatively coupled sensors and their respective sensor signals for a condition that triggers a transition in the light transmissivity state of the selectively transparent window 210 from a second light transmissivity state. For example, in step 350, when the proximity sensor 236 provides a proximity sensor signal indicating the presence of a passerby, the controller 220, in step 360, generates a control signal to transition the selectively transparent windows 210 to a third light transmissivity state. The third light transmissivity state increases the percentage of visible light transmission as compared to the percentage of visible light transmission of the second light transmissivity state. As a result, a passerby may be able to view an unattended occupant inside the vehicle 120.

While maintaining the selectively transparent windows 210 in a third light transmissivity state the controller 220 returns to step 330 to monitor the communicatively coupled sensors and their respective sensor signals for a condition that triggers a transition in the light transmissivity state of the selectively transparent window 210. In some embodiments, the condition that triggers a transition in the light transmissivity state of the selectively transparent window 210 may be a lapse of a predetermined amount of time. For example, a controller 220, in step 330, may transition a selectively transparent window 210 to the second light transmissivity state upon the passage of 10 minutes from initiating maintenance of the selectively transparent window 210 in a first light transmissivity state from step 320 or upon the passage of 10 minutes from transitioning to a third light transmissivity state in step 360. Alternatively, for example, a controller 220, in step 330, may transition a selectively transparent window 210 to the second light transmissivity state upon the passage of 10 minutes from detecting the presence of a passerby in step 350.

In embodiments, the degree of any of the light transmissivity states may be determined based on a light sensor signal indicating the intensity level of the sun 110 on the vehicle 120. For example, on a cloudy day where the light intensity is not as great as the light intensity on a cloudless sunny day, the second light transmissivity state on a cloudy day may be such that more light is transmitted than the amount of light transmitted by the second light transmissivity state on a cloudless sunny day.

Figure 4A:
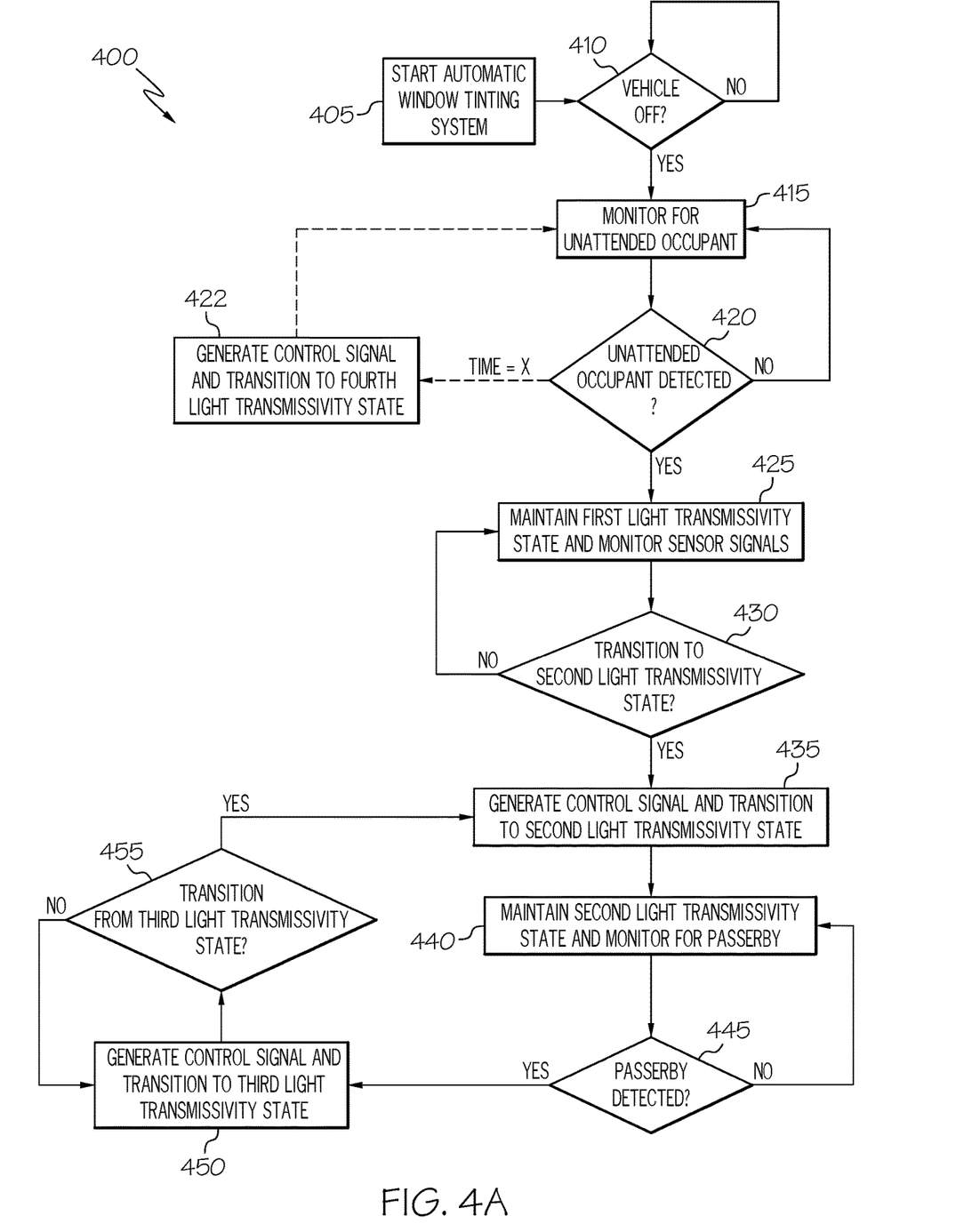
FIG. 4A is a flowchart of an example embodiment of a method for automatically controlling the tint of a vehicle window according to one or more embodiments shown and described herein.

Referring now to FIG. 4A, a flowchart of another example embodiment of a method for automatically controlling the tint of a vehicle window 122 is depicted. The flowchart depicted in FIG. 4A is a representation of computer readable and executable instruction set stored in the non-transitory computer readable memory 224 and executed by the processing unit 222 of the controller 220. The process of the flowchart 400 in FIG. 4A is executed at various times and in response to signals from the sensors communicatively coupled to the controller 220.

In step 405 of FIG. 4A, the automatic window tinting system 200 is activated. The automatic window tinting system 200 may be activated when the state of the vehicle 120 is off, for example, when the vehicle 120 is parked and/or the drive system is powered off. As a non-limiting example, the state of the vehicle 120 may be determined in response to an ignition sensor signal indicating the drive system of the vehicle 120 is turned off. Additionally, the state of the vehicle 120 may be determined in response to an ignition sensor signal indicating the vehicle 120 is in park or any other state indicative of a vehicle 120 being shut-off, for example, a drop in oil pressure, a camshaft position, a battery voltage level, or the like. In some embodiments, the automatic window tinting system 200, in step 410, suspends activation until a signal from a sensor to the controller 220 indicating the doors of the vehicle 120 are locked, and the drive system is off. For example, in step 410, when a door lock sensor indicates the doors are locked the automatic window tinting system 200 proceeds to step 415. If there is no indication the condition has been met the controller 220 of the automatic window tinting system 200 continues to monitor the signals from the sensors for the condition defined in step 410.

In other embodiments, when the automatic window tinting system 200 activates in step 405, the automatic window tinting system 200 may generate a prompt on a tactile display within the vehicle 120 providing for feedback from an occupant. The feedback may be an option to suspend or deactivate the automatic window tinting system 200. The feedback may be responded to by selecting an onscreen button or activating another input device configured to transmit a signal to the controller 220 of the automatic window tinting system 200. An occupant may select to suspend the automatic window tinting system 200 if they do not want the vehicle windows 122 to automatically tint.

In step 415, the automatic window tinting system 200 starts monitoring for an unattended occupant. In step 420, the controller 220 determines based on at least the occupant sensor 230 whether there is an unattended occupant in the vehicle 120. If the occupant sensor 230 generates an occupant sensor signal indicative of an unattended occupant, the controller 220, in step 425, provides a control signal to the selectively transparent windows 210 to maintain the selectively transparent windows 210 in a first light transmissivity state. This allows a passerby to see an unattended occupant in the vehicle 120 cabin. In some embodiments, the controller 220, in step 425, may generate signals to cycle the selectively transparent window 210 between a first light transmissivity state and a second light transmissivity state. The cycling of between a more transparent and less transparent state may still allow a passerby to see an unattended occupant in the vehicle cabin while providing an intermittent reduction in the amount of light transmitted into the vehicle cabin. Additionally, the cycling between light transmissivity states may also function to attract attention to the vehicle 120 where an unattended occupant is located.

In some embodiments, if an unattended occupant is not detected, in step 420, after a predetermined amount of time, the controller 220, may enter a loop including step 422. In step 422, the controller 220 generates a control signal to transition the selectively transparent window 210 to a fourth light transmissivity state. The fourth light transmissivity state allows less light to transmit through the selectively transparent window 210 as compared to the first light transmissivity state. The fourth light transmissivity state may allow an equal or less amount light to transmit through the selectively transparent window 210 as compared to the selectively transparent window 210 in the second light transmissivity state.

However, if an unattended occupant is detected, in step 420, the controller 220 maintains the selectively transparent window 210 in the first light transmissivity state, until the controller 220, in step 430, detects a condition to initiate a transition of the selectively transparent window 210 to a second light transmissivity state. In some embodiments, the condition is a temperature signal indicating the temperature in a vehicle 120 is greater than a threshold value. In other embodiments, the condition is a temperature signal from a temperature sensor 232 inside the vehicle 120 that indicates a predefined percentage increase in temperature as compared to a temperature signal from a temperature sensor 232 outside the vehicle 120. For example, if a temperature sensor 232 outside the vehicle 120, such as, an external temperature sensor, indicates that the temperature outside the vehicle 120 is 70 degrees Fahrenheit and the predetermined percentage increase is set at 10%, then when a temperature sensor 232 inside the vehicle 120 indicates a temperature inside the vehicle 120 is 77 degrees Fahrenheit the condition in step 430 is met. In yet other embodiments, the condition in step 430 is met when a temperature signal from a temperature sensor 232 inside the vehicle 120 increases by a predetermined percentage of a temperature inside the vehicle 120 that was sampled and stored when the unattended occupant was detected in step 420. For example, if the temperature inside the vehicle 120 when the unattended occupant was detected was 70 degrees Fahrenheit and the predetermined percentage increase is set at 10%, then when the temperature sensor 232 inside the vehicle 120 indicates a temperature inside the vehicle 120 is 77 degrees Fahrenheit the condition in step 430 is met.

While a predetermined percentage increase of 10% is used in the above examples, embodiments are not limited to 10%. Embodiments may include predetermined percentage increases greater or less than a 100 increase. Additionally, embodiments may comprise predetermined percentage increases based on the initial temperature value detected by the temperature sensor 232. For example, if an initial temperature value is 70 degrees Fahrenheit, the predetermined percentage increase may be set to 15%, but if an initial temperature value is 80 degrees Fahrenheit, the predetermined percentage increase may be set to 5%. This may be done to cause the automatic window tinting system 200 to reduce the amount of light transmitted into the vehicle 120 when the vehicle cabin temperature is already at an elevated level when an unattended occupant is detected. In such embodiments, the various predetermined percentage increases may be stored in the non-transitory computer readable memory 224 and accessed by the processing unit 222 for determining when to transition the selectively transparent window 210.

In some embodiments, the controller 220 may determine in step 430 to proceed to step 435 after a predetermined amount of time. In step 435, the controller 220 generates a control signal to transition the selectively transparent windows 210 to a second transmissivity state. The transition to the second transmissivity state reduces the rate of heating of the vehicle cabin due to solar energy 112. In other embodiments, a combination of time and change in temperature may cause the controller 220 to transition to step 435.

In step 440, the controller 220 monitors a proximity sensor signal for the presence of a passerby. In step 445, when the proximity sensor signal indicates the presence of a passerby the controller 220 proceeds to step 450. In step 450, the controller 220 generates a control signal that transitions the selectively transparent window 210 from a second light transmissivity state to a third light transmissivity state that allows more light to transmit through the selectively transparent window 210 than in the second light transmissivity state.

In yet further embodiments, step 450 may include displaying text on the selectively transparent window 210. For example, the selectively transparent window 210 may comprise a liquid crystal display capable of receiving a control signal comprising instructions for displaying text. A communicatively coupled processing unit 222 and non-transitory computer readable memory 224 may function as a display driver that generates signals for activating elements of the display in a temporal sequence to create the desired text or images. In such embodiments, a displayed text may include a message comprising, without limitation, "Help", "Hello" or "Stay Away." The displayed text may capture the attention of a passerby to observe an unattended occupant in the vehicle 120. Step 450 may also include activating the horn, flashing the vehicle lights, or activating the dome light inside the vehicle 120 to further capture the attention of the passerby in hopes of observing the unattended occupant.

In step 455, the controller 220 monitors for a condition that triggers transitioning the selectively transparent window 210 from the third light transmissivity state. In some embodiments, the condition in step 455 is the further increase in temperature inside the vehicle 120 as indicated by the temperature signal of a temperature sensor 232 inside the vehicle 120 to the controller 220. In some embodiments, the condition in step 455 is a temperature signal indicating the temperature in a vehicle 120 is greater than a threshold value. In other embodiments, the condition in step 455 is a temperature signal from a temperature sensor 232 inside the vehicle 120 that indicates a predefined percentage increase in temperature as compared to a temperature signal from a temperature sensor 232 outside the vehicle 120. For example, if a temperature sensor 232 outside the vehicle 120, such as, an external temperature sensor, indicates that the temperature outside the vehicle 120 is 70 degrees Fahrenheit and the predetermined percentage increase is set at 10%, then when a temperature sensor 232 inside the vehicle 120 indicates a temperature inside the vehicle 120 is 77 degrees Fahrenheit the condition in step 455 is met. In yet other embodiments, the condition in step 455 is met when a temperature signal from a temperature sensor 232 inside the vehicle 120 increases by a predetermined percentage of a temperature inside the vehicle 120 stored in the non-transitory computer readable memory 224 when an unattended occupant was detected in step 420. When the condition in step 455 is met the controller 220 may proceed to step 435. When the condition in step 455 is not met, the controller 220 continues to monitor for the condition.

In other embodiments, the condition in step 455 is the passage of a predetermined amount of time. The predetermined amount of time may be determined by the passage of, for example, 10 minutes from the point in time at which the proximity sensor signal no longer indicates the presence of the passerby. In other embodiments, the predetermined amount of time may be determined by the passage of, for example, 15 minutes from the transition of the selectively transparent window 210 to the third transmissivity state. It should be understood that the predetermined amount of time in the previous examples is non-limiting and that, in some embodiments, a user may set the predetermined amount of time.

Figure 4B:
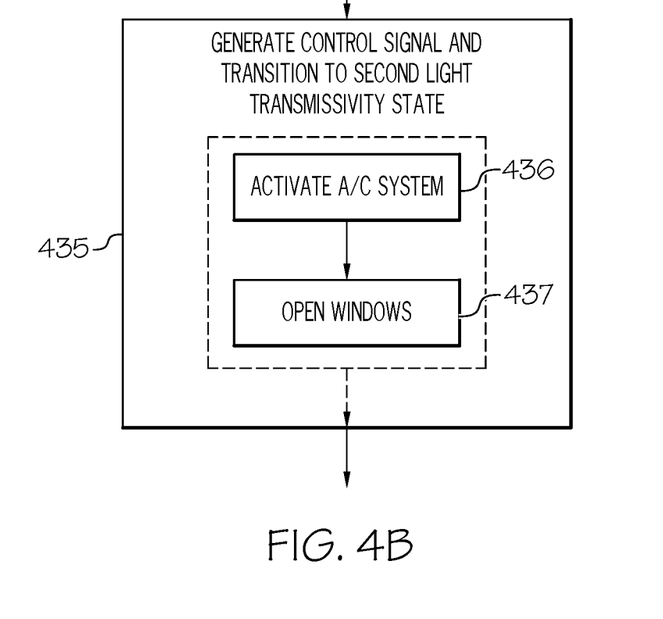
FIG. 4B is a flowchart of additional steps of the method for automatically controlling the tint of a vehicle window from the flowchart of FIG. 4A according to one or more embodiments shown and described herein.

Referring now to FIG. 4B, a flowchart expanding on step 435 of FIG. 4A of a method for automatically controlling the tint of a vehicle window 122 is depicted. Step 435 may further comprise step 436 and/or step 437. Step 436 includes activating the air conditioning system 260 in the vehicle 120 to reduce the cabin temperature when an unattended occupant is detected. For example, in addition to the controller 220 generating a control signal that transitions the selectively transparent window 210 to the second transmissivity state in step 435, the controller 220 may generate a control signal that activates the air conditioning system 260. The control signal may activate the air conditioning system 260 regardless of whether the drive system of the vehicle 120 is on. By way of another non-limiting example, once the controller 220 transitions the selectively transparent window 210 to the second transmissivity state in step 435, the controller 220 may continue to monitor the temperature signal from the temperature sensor 232 inside the vehicle 120. If the temperature signal of the temperature sensor 232 inside the vehicle 120 indicates a temperature greater than a second threshold value the controller 220 will generate a control signal that activates the air conditioning system 260. In other embodiments, the air conditioning system 260 is activated in response to a temperature signal from a temperature sensor 232 inside the vehicle 120 that indicates a predefined percentage increase in temperature as compared to a temperature signal from a temperature sensor 232 outside the vehicle 120. In yet other embodiments, the air conditioning system 260 is activated when a temperature signal from a temperature sensor 232 inside the vehicle 120 increases by a predetermined percentage of a temperature inside the vehicle 120 stored in the non-transitory computer readable memory 224 when an unattended occupant was detected in step 420. It is understood that while activation of the air conditioning system 260 by the controller 220 of the automatic window tinting system 200 is described above in relation to step 435, this action may occur at any time during the operation of the automatic window tinting system 200. Additionally, step 435 may also include step 437. Step 437 includes generating a control signal with the controller 220 to open one or more of the vehicle windows 122. It is understood that the aforementioned described step 436 and associated conditions for activating the air conditioning system 260 may also be applied to the activation of opening or closing a vehicle window 122.

Figure 4C:
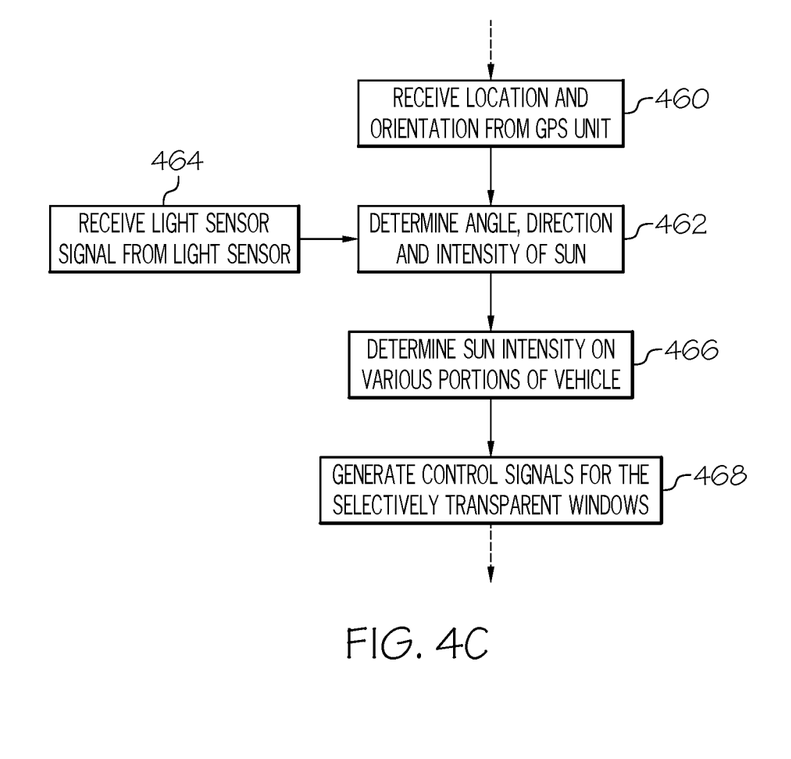
FIG. 4C is a flowchart of additional steps of the method for automatically controlling the tint of a vehicle window from the flowchart of FIG. 4A according to one or more embodiments shown and described herein.

Referring to FIG. 4C, a flowchart including a subroutine of the automatic window tinting system 200 of FIG. 4A is depicted. In additional embodiments of the automatic window tinting system 200, the system may include a controller 220 communicatively coupled to a GPS unit 238. The GPS unit 238 may provide the controller 220 with the location and orientation of the vehicle 120 in step 460. In response, the controller 220, in step 462, may determine the angle and direction of the sun 110 in relation to the vehicle location and orientation. Sun angles and directions may be defined in the non-transitory computer readable memory 224 as a function of an input location from the GPS unit 238. Alternatively, the sun angle, direction, intensity may be determined from one or more light sensors 240 positioned on the vehicle 120 that generate light sensor signals indicative of the light incident on the light sensor 240. The controller 220, in step 464, may receive the one or more light sensor signals to determine the angle, direction and intensity of the sun 110 on the vehicle 120, in step 462. In step 466, the controller 220 may also determine the intensity of the sun 110 upon various portions of the vehicle 120. The controller 220 may utilize the determinations in step 466 when generating control signals for adjusting the light transmissivity state of the selectively transparent windows 210 in step 468. For example, if the intensity of the sun 110 is greater on the windshield as compared to the rear window, the controller 220 may provide a control signal to the selectively transparent window 210 coupled to the windshield such that the light transmissivity state for the selectively transparent window 210 coupled to the windshield allows less or an equal amount of light to transmit through the windshield as compared to the light transmissivity state for the selectively transparent window 210 coupled to the rear window. While the car is parked, this configuration may allow a passerby to view an unattended occupant through the rear window while still providing a level of solar energy 112 protection through the windshield where the light intensity is greater. The subroutine defined in FIG. 4C may be implemented any time the controller 220 of automatic window tinting system 200 is maintaining or transitioning the selectively transparent windows 210. Additionally, the subroutine defined in FIG. 4C may be implemented while the car is in operation and/or in motion to reduce the impact of sun light on the vehicle cabin.

In embodiments of the automatic window tinting system 200, the selectively transparent window 210 may be coupled to one or more of the vehicle windows 122. Additionally, each selectively transparent window 210 may be controlled by the controller 220 independently from the other selectively transparent windows 210. Further, the first light transmissivity state, the second light transmissivity state, the third light transmissivity state, and the fourth light transmissivity state are used herein to identify the various states of light transmissivity. The use of "first," "second," "third," or "fourth" is not intended to suggest a relative relationship between the light transmissivity states. That is, for example, the fourth light transmissivity state may allow less light to transmit through the selectively transparent window 210 than the first light transmissivity state but the fourth light transmissivity state may also allow more light to transmit through the selectively transparent window 210 than the second light transmissivity state. That is, in this example, the "fourth" is greater than the "first" but less than the "second."

It should now be understood that embodiments described herein are directed to an automatic window tinting system for a vehicle that may adjust the light transmissivity state of one or more vehicle windows in response to at least an occupant sensor, temperature sensor and a proximity sensor. The automatic window tinting system herein comprises a controller enabled to receive sensor signals and output control signals for adjusting selectively transparent windows coupled to vehicle windows and optionally activating other vehicle systems to reduce the temperature increase in a vehicle cabin with an unattended occupant.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An automatic window tinting system for a vehicle, the automatic window tinting system comprising:
    a selectively transparent window coupled to one or more vehicle windows,
    a controller comprising a processing unit and a non-transitory computer readable memory wherein the controller is electrically coupled to the selectively transparent window;
    a temperature sensor communicatively coupled to the controller, wherein the temperature sensor provides a temperature signal indicative of a temperature inside the vehicle;
    an occupant sensor communicatively coupled to the controller, wherein the occupant sensor provides an occupant sensor signal indicative of a presence or an absence of an unattended occupant;
    a proximity sensor communicatively coupled to the controller, wherein the proximity sensor provides a proximity sensor signal indicative of a presence or an absence of a passerby;
    a computer readable and executable instruction set stored in the non-transitory computer readable memory which, when executed by the processing unit:
        receives, with the processing unit, the occupant sensor signal, the temperature signal and the proximity sensor signal;
        transitions the selectively transparent window to a first light transmissivity state when the occupant sensor signal is indicative of the presence of the unattended occupant;
        transitions the selectively transparent window to a second light transmissivity state when the temperature signal is indicative of the temperature inside the vehicle that is greater than a threshold value; and
        transitions the selectively transparent window to a third light transmissivity state when the proximity sensor signal is indicative of the presence of the passerby, wherein the third light transmissivity state is maintained while the proximity sensor signal is indicative of the presence of the passerby.

2. The automatic window tinting system of claim 1, wherein the second light transmissivity state is greater than the first light transmissivity state such that more light is transmitted through the selectively transparent window when the selectively transparent window is in the first light transmissivity state than in the second light transmissivity state.

3. The automatic window tinting system of claim 1, wherein the third light transmissivity state is less than the second light transmissivity state such that less light is transmitted through the selectively transparent window when the selectively transparent window is in the second light transmissivity state than in the third light transmissivity state.

4. The automatic window tinting system of claim 1, wherein the occupant sensor comprises a weight sensor positioned within a vehicle seat wherein the weight sensor provides the occupant sensor signal indicative of the presence or the absence of the unattended occupant.

5. The automatic window tinting system of claim 1, wherein the computer readable and executable instruction set further causes the processing unit to display text on the one or more vehicle windows to message the passerby when the occupant sensor signal is indicative of the presence of the unattended occupant and when the proximity sensor signal is indicative of the presence of the passerby.

6. The automatic window tinting system of claim 1, wherein the threshold value is a percentage increase, the percentage increase defines an increase in the temperature inside the vehicle with respect to the temperature outside the vehicle.

7. The automatic window tinting system of claim 1, wherein the computer readable and executable instruction set further causes the processing unit to independently adjust a light transmissivity state of the selectively transparent window of each of the one or more vehicle windows in response to an intensity of incident light on each of the one or more vehicle windows.

8. The automatic window tinting system of claim 1, further comprising a global positioning system communicatively coupled to the controller, wherein the computer readable and executable instruction set further causes the processing unit to receive a location and orientation signal from the global positioning system and independently adjust a light transmissivity state of the selectively transparent window of each of the one or more vehicle windows in response to the location and orientation signal received from the global positioning system.

9. The automatic window tinting system of claim 1, wherein the selectively transparent window is coupled to at least one of: a windshield of the vehicle, a rear window of the vehicle, a moon roof of the vehicle, or one or more vehicle side windows.

10. The automatic window tinting system of claim 1, wherein the computer readable and executable instruction set further causes the processing unit to activate an air conditioning system of the vehicle when the temperature signal indicative of the temperature inside the vehicle is greater than the threshold value.

11. The automatic window tinting system of claim 1, wherein the computer readable and executable instruction set further causes the processing unit to open the one or more vehicle windows when the temperature signal indicative of the temperature inside the vehicle is greater than the threshold value.

12. The automatic window tinting system of claim 1, wherein the computer readable and executable instruction set further causes the processing unit to transition the selectively transparent window to a fourth light transmissivity state when the occupant sensor signal is not indicative of the presence of the unattended occupant.

13. A method of automatically tinting a vehicle window, the method comprising:
determining a presence of an unattended occupant in a vehicle with an occupant sensor, wherein the occupant sensor generates an occupant sensor signal indicative of the presence or an absence of the unattended occupant;
providing a first control signal to a selectively transparent window to change the selectively transparent window to a first light transmissivity state when the occupant sensor signal is indicative of the presence of the unattended occupant;
monitoring a temperature inside the vehicle with a temperature sensor, wherein the temperature sensor generates a temperature signal indicative of the temperature inside the vehicle;
monitoring an area around the vehicle for a presence of a passerby with a proximity sensor, wherein the proximity sensor generates a proximity sensor signal indicative of the presence or an absence of the passerby;
providing a second control signal to the selectively transparent window to change the selectively transparent window to a second light transmissivity state when the temperature signal is indicative of the temperature inside the vehicle that is greater than a threshold value; and
providing a third control signal to the selectively transparent window to change the selectively transparent window to a third light transmissivity state when the proximity sensor signal is indicative of the presence of the passerby, wherein the third light transmissivity state is maintained while the proximity sensor signal is indicative of the presence of the passerby.

14. The method of claim 13, further comprising:
activating an air conditioning system in the vehicle when the temperature signal is indicative of the temperature inside the vehicle that is greater than the threshold value.

15. The method of claim 13, further comprising:
displaying text on one or more vehicle windows when the occupant sensor signal is indicative of the presence of the unattended occupant and when the proximity sensor signal is indicative of the presence of the passerby.

16. The method of claim 13, further comprising:
opening one or more vehicle windows when the temperature signal is indicative of the temperature inside the vehicle that is greater than the threshold value.

17. An automatic window tinting system comprising:
a selectively transparent window coupled to one or more vehicle windows,
a controller comprising a processing unit and a non-transitory computer readable memory wherein the controller is electrically coupled to the selectively transparent window;
a temperature sensor communicatively coupled to the controller, wherein the temperature sensor provides a temperature signal indicative of a temperature inside a vehicle;
an occupant sensor communicatively coupled to the controller, wherein the occupant sensor provides an occupant sensor signal indicative of a presence or an absence of an unattended occupant;
a proximity sensor communicatively coupled to the controller, wherein the proximity sensor provides a proximity sensor signal indicative of a presence or an absence of a passerby;
a computer readable and executable instruction set stored in the non-transitory computer readable memory which, when executed by the processing unit:
receives, with the processing unit, the occupant sensor signal, the temperature signal and the proximity sensor signal;
transitions the selectively transparent window to a first light transmissivity state when the occupant sensor signal is indicative of the presence of the unattended occupant;
transitions the selectively transparent window to a second light transmissivity state when the temperature signal is indicative of the temperature inside the vehicle that is greater than a threshold value;
transitions the selectively transparent window to a third light transmissivity state when the proximity sensor signal is indicative of the presence of the passerby, wherein the third light transmissivity state is maintained while the proximity sensor signal is indicative of the presence of the passerby and the occupant sensor signal is indicative of the presence of the unattended occupant; and
transitions the selectively transparent window to a fourth light transmissivity state when the occupant sensor signal is indicative of the absence of the unattended occupant.

18. The automatic window tinting system of claim 17, wherein the computer readable and executable instruction set further causes the processing unit to independently adjust a light transmissivity state of the selectively transparent window of each of the one or more vehicle windows in response to an intensity of incident light on each of the one or more vehicle windows.

19. The automatic window tinting system of claim 17, further comprising a global positioning system communicatively coupled to the controller, wherein the computer readable and executable instruction set further causes the processing unit to receive a location and orientation signal from the global positioning system and independently adjust a light transmissivity state of the selectively transparent window of each of the one or more vehicle windows in response to the location and orientation signal received from the global positioning system.

20. The automatic window tinting system of claim 17, wherein the threshold value is a percentage increase, the percentage increase defines an increase in the temperature inside the vehicle with respect to the temperature outside the vehicle.

* * * * *

UNITED STATES PATENT AND TRADEMARK OFFICE
CERTIFICATE OF CORRECTION

PATENT NO. : 10,576,809 B2
APPLICATION NO. : 15/426429
DATED : March 3, 2020
INVENTOR(S) : Charan S. Lota

Page 1 of 1

It is certified that error appears in the above-identified patent and that said Letters Patent is hereby corrected as shown below:

In the Specification

In Column 9, Line 64, delete "for for" and insert --for--, therefor.

Signed and Sealed this
Nineteenth Day of May, 2020

Andrei Iancu
*Director of the United States Patent and Trademark Office*